Sept. 9, 1952     H. E. BALSIGER ET AL     2,609,914
ARTICLE FEEDING DEVICE
Filed Dec. 4, 1946     3 Sheets-Sheet 1
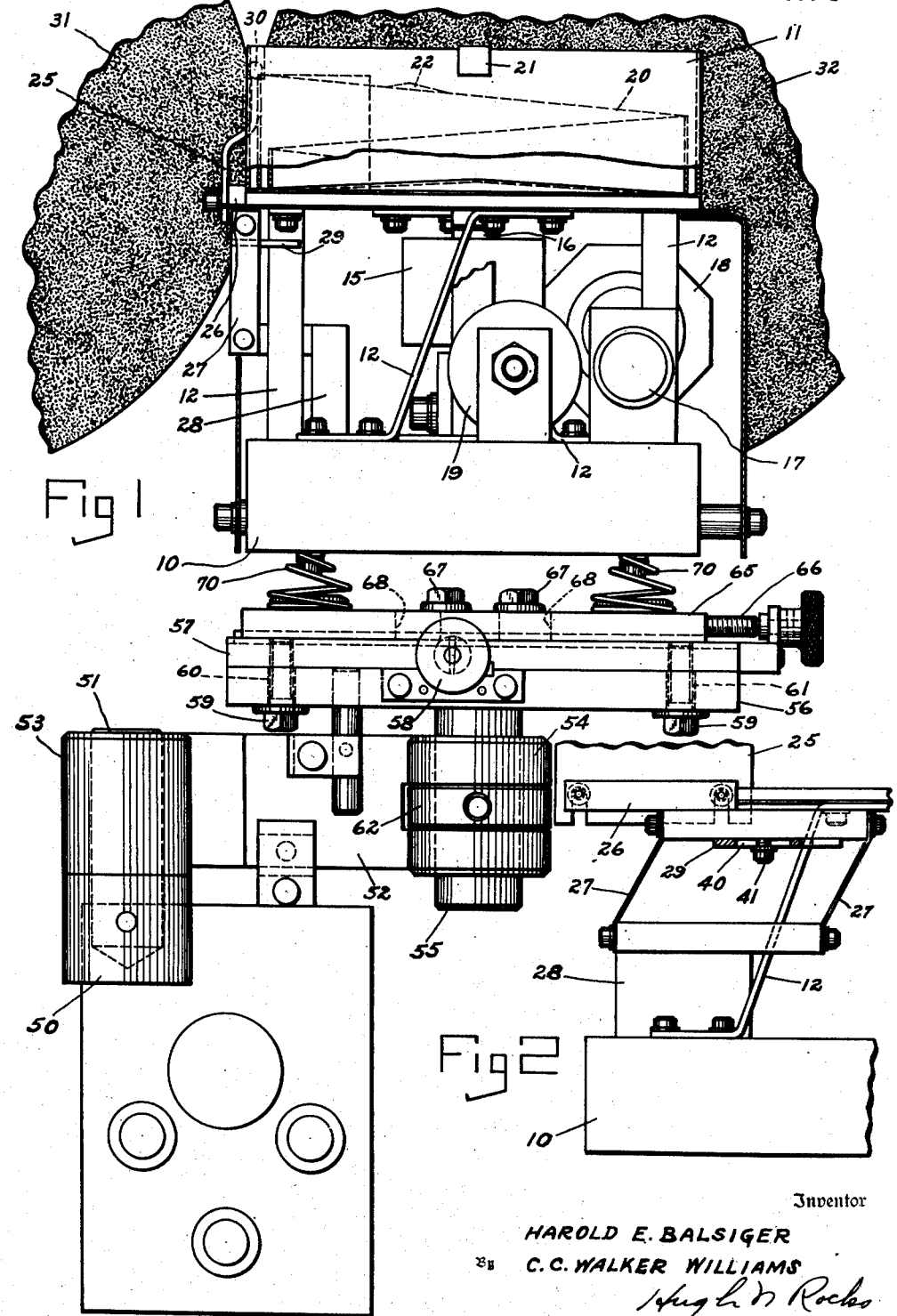
Inventor
HAROLD E. BALSIGER
C. C. WALKER WILLIAMS
By Hugh N. Roches
Attorney

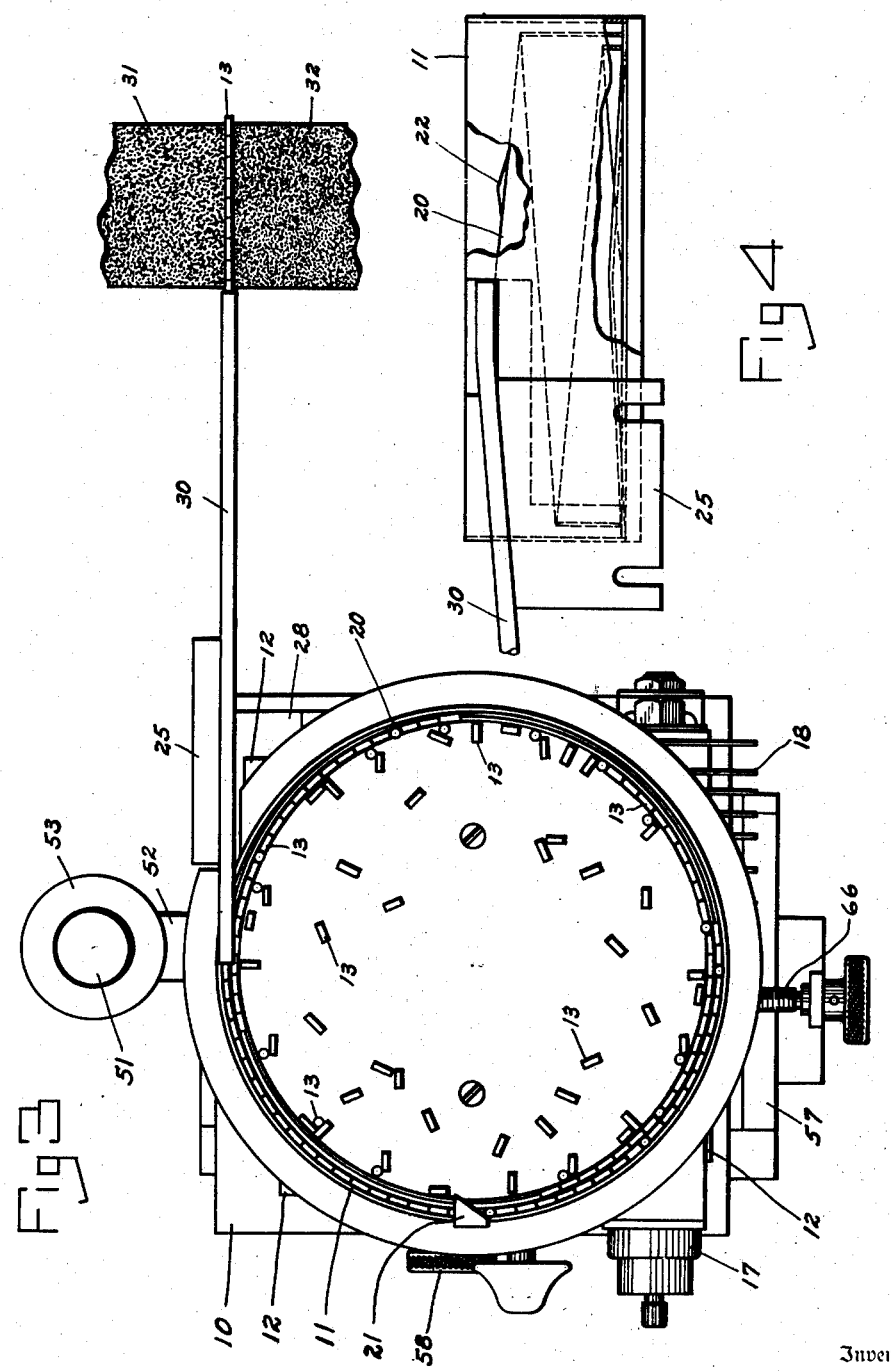

Sept. 9, 1952  H. E. BALSIGER ET AL  2,609,914
ARTICLE FEEDING DEVICE
Filed Dec. 4, 1946  3 Sheets-Sheet 3
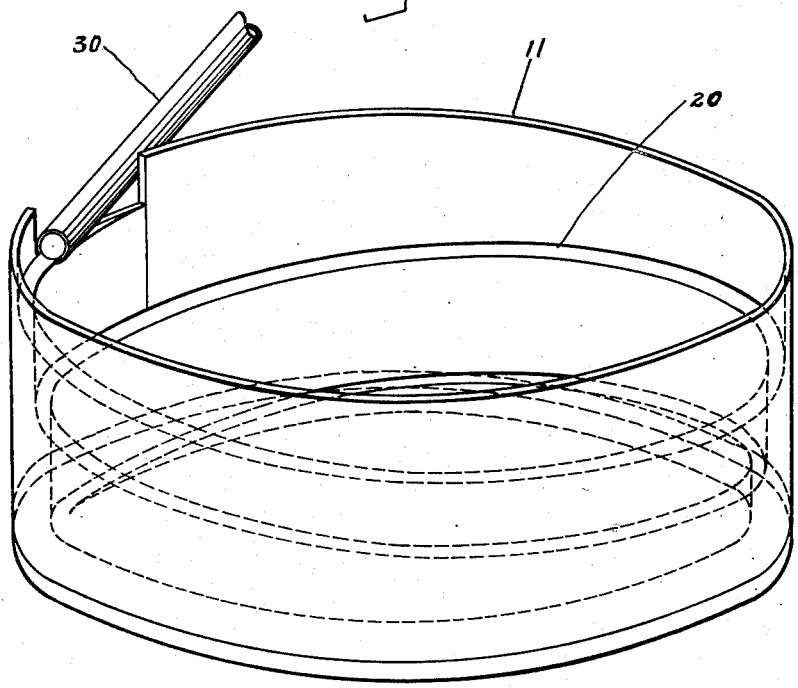
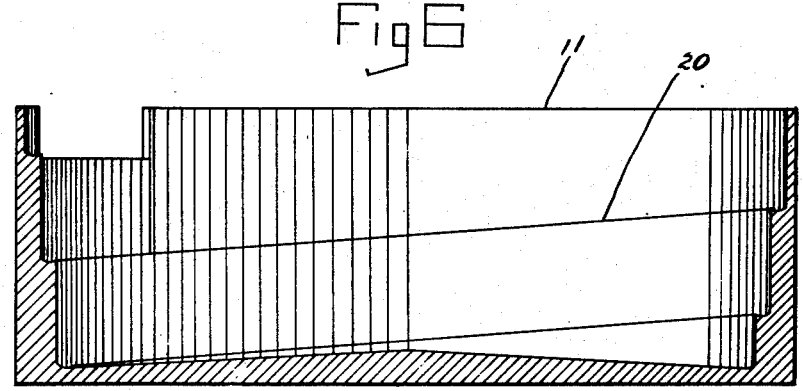
Inventor
HAROLD E. BALSIGER
C. C. WALKER WILLIAMS
Attorney

UNITED STATES PATENT OFFICE 2,609,914

ARTICLE FEEDING DEVICE

Harold E. Balsiger and Charles C. W. Williams, Waynesboro, Pa., assignors to Landis Tool Company, Waynesboro, Pa.

Application December 4, 1946, Serial No. 713,954

2 Claims. (Cl. 198—33)

This invention relates to an article feeding device for machine tools, packaging devices et cetera but particularly for centerless grinding machines.

Article feeding means for through feed grinding on this type of machine are of two general types: (a) gravity, and (b) horizontally operated devices actuated by a weight or by an electric motor. In most of these devices, the work is supplied in small amounts and in proper position for introduction to the point of operation. Where a hopper is used, a very complicated and bulky mechanism is required to control the flow of articles to the mechanism for transferring them in the proper position to the point of operation.

It is an object of this invention to provide means for vibrating the hopper.

A further object is to provide means for determining the magnitude of the vibrations.

A further object is to cause the articles in the hopper to be moved continuously in a substantially circular path.

A further object is to provide a vertically positioned solenoid for vibrating the hopper.

A further object is to provide a device for removing articles from a hopper in a single line and moving them in an axial direction.

A further object is to provide a device mounted independently of the hopper for conveying articles from the hopper to the point of operation.

A further object is to provide means for vibrating said conveyor and said hopper from a single vibrating device.

In the drawings:

Figure 1 is a front elevation of a feeding device.

Figure 2 is an end view of the tube supporting structure.

Figure 3 is a plan view of the device.

Figure 4 is a partial end elevation showing the track on the inside of the hopper.

Figure 5 is a view in perspective of the hopper.

Figure 6 is an elevation in section of said hopper.

This invention consists of a base member 10 having means for supporting a circular hopper 11 thereon. Said supporting means consists of a series of resilient members 12 arranged circumferentially about the underside of said hopper and inclined from said base to said hopper in a counter-clockwise direction, or clockwise direction.

The means for vibrating said hopper consists of a solenoid 15 mounted with its axis in a vertical position. The core 16 of said solenoid is in alignment with a pad on the bottom of said hopper and spaced therefrom by an amount suitable for operation thereof. Current for energizing said solenoid may be obtained from any A. C. source through a switch 17, rectifier 18 and rheostat 19. The rheostat controls the rate of feed by adjusting the magnitude of the vibrations. The rectifier changes the A. C. to a pulsating or intermittent D. C.

The bottom of said hopper 11 is high at the center and inclines toward the outside. The reason for this is to enable the force of gravity to cooperate with centrifugal force in urging articles 13 toward the wall of the hopper.

An inclined track 20 is provided about the inside wall of said hopper and merging at its lower end into the surface of the bottom of said hopper. Such a track may be cut or molded in the side walls, or it may be formed of sheet metal and attached thereto. Said track extends nearly to the top of said hopper to a point where the wall is cut away to receive a tubular member 30 leading to a centerless grinding throat formed by abrasive wheels 31 and 32. The width of track 20 is preferably slightly less than the diameter of the work pieces 13 so as to accommodate only a single succession of work pieces.

Near the end of track 20 and suspended above it on the side of the hopper is an inwardly projecting cam like member 21. The function of this member is to remove from the track those articles which are moving along in an upright position.

Ahead of member 21 on the track is a hump 22. Occasionally, for various reasons, the movement of articles through tube 30 is obstructed or there is a tendency to feed faster than the pieces are being ground. In such cases the hump causes the line of articles to buckle and fall back into the hopper. As soon as the obstruction is removed or the rate of feed reduced, the articles will move over the hump without buckling.

A plate 25 welded to tube 30 is removably attached to a block 26. Said block is supported by two parallel flat springs 27 one at each end of block 26. Said springs are mounted on a bracket 28 which in turn is mounted on base 10. An L shaped plate 29 is secured to the underside of block 26 and has a slot 40 to permit adjustment lengthwise of said block. A screw 41 holds said plate in adjusted position. The purpose of the adjustment is to move the base portion of the L into operative relation with the resilient supporting member 12. The vibratory movement of said member resulting from the vibration of hopper 11 is transmitted through plate 29 and block 26 to tube 30. Thus, while said tube is mounted on base 10 it has no other connection with the hopper except the contact between the support member 12 and plate 29 for transmitting vibration to said tube. The tube and hopper may therefore be vibrated independently of one another even though the vibration producing mechanism is common to both.

One means for supporting said article feeding device on a machine consists of a bracket 50 having a short vertical shaft 51 inserted therein. An arm 52 having a cylindrical bearing portion at each end is supported by mounting one of said bearings 53 on shaft 51. The other bearing 54 consisting of spaced upper and lower portions has inserted therein a second vertical shaft 55 having a screw thread thereon (not shown). A nut 62 between said upper and lower portions serves to raise or lower the feed mechanism assembly. A base member 56 is mounted on shaft 55. A member 57 is slidably mounted for adjustment on base 56. Adjustment of said member is effected by turning screw 58 after loosening clamping screws 59 in slots 60 and 61. A second slidable member 65 is mounted on member 57 and adjustable in a direction perpendicular to that of said member 57. This adjustment is effected by means of screw 66. Member 65 is held in adjusted position by screws 67 which pass through slots 68 in said member.

Base 10 and the parts mounted thereon are resiliently supported on slide 65 by coil springs 70.

*Operation*

Assuming the hopper 11 to be filled with blank work pieces to be fed to a centerless grinder, the solenoid 15 is energized by turning switch 17. Said solenoid exerts an attraction on the bottom of said hopper in a vertical direction. In responding to the solenoid the hopper is guided by resilient members 12. When said hopper moves downwardly attracted by said solenoid, the vertical movement is modified slightly by the action of the resilient members which, because of their inclination, add a horizontal component to the vertical movement. The rectified A. C. current is known as pulsating direct current and this current causes vibration by starting and stopping the flow of current to said solenoid at a frequency depending on the frequency of the A. C. source. While solenoid 16 is momentarily de-energized, the resilient members 12 return hopper 11 to its initial position. The resultant effect of the above described operations is to cause the hopper 11 to vibrate in a vertical path and at the same time to have a slight turning movement about its own axis. The effect of this movement on the articles 13, in this case small cylindrical work pieces, is to cause them to circulate in the hopper in a clockwise direction. The bottom of the hopper is crowned slightly so that the workpieces move to the outside. Those on the outside are caused to move up an inclined track 20 along the wall of the hopper. This track is just wide enough to hold a single work piece. Most of the pieces move up the track in an axial direction. A few stand on end and these are returned to the hopper as they pass projecting member 21 which tilts them off of the track.

Tube 30 is vibrated in a vertical plane only by virtue of the springs 27 supporting said tube and the contact between one of the hopper supporting members 12 and plate 29. Thus, both angular and rectilinear vibratory movement is effected from a single source of vibration.

One of the principal advantages of this type of feeding mechanism is that it will function just as well with a single article as it will with a hopper full.

We claim:

1. A device for feeding articles including a cylindrical hopper having side wall and bottom integral, means for effecting vertical vibration of said hopper, supporting means for said hopper effective to convert part of said vertical movement to oscillating movement about the axis of said hopper whereby to cause said articles to move continuously in a circumferential path, and means responsive to said movement for guiding said articles from the bottom of said hopper including an inclined track formed on the inside wall of said hopper and merging with the bottom thereof and extending to a point of discharge at an elevation higher than the articles in the hopper, said track serving to intercept individual articles and to conduct them to said point of discharge, the width of said track being such as to retain only a single line of articles and to reject those in a crosswise position.

2. A device for conveying individual articles from a miscellaneous arrangement thereof to a discharge point including an upright cylindrical hopper having side wall and bottom integral, means for effecting a combined vertical and horizontal vibration of said hopper so as to cause the articles to move in a circular path therein, a curved track disposed within said hopper and inclined upwardly along the inside wall thereof and vibrated therewith, said track merging into the bottom of said hopper for receiving said articles and arranging them in predetermined alignment for discharge from the hopper, said track being open at the inside thereof and of a width to retain only a single line of articles thereon, vibration of said track causing said articles to move along the same to the discharge point.

HAROLD E. BALSIGER.
CHARLES C. W. WILLIAMS.

REFERENCES CITED

The following references are of record in the file of this patent:

UNITED STATES PATENTS

| Number | Name | Date |
|---|---|---|
| 1,795,243 | Bergling | Mar. 3, 1931 |
| 1,862,351 | Hagiwara | June 7, 1932 |
| 2,374,664 | Carrier, Jr. | May 1, 1945 |
| 2,464,216 | Devol | Mar. 15, 1949 |

FOREIGN PATENTS

| Number | Country | Date |
|---|---|---|
| 279,119 | Great Britain | Oct. 15, 1927 |